United States Patent
Qualich et al.

(10) Patent No.: US 7,183,896 B2
(45) Date of Patent: Feb. 27, 2007

(54) WAKE-UP CIRCUIT

(75) Inventors: John R. Qualich, Buffalo Grove, IL (US); Perry A. Emrath, Barrington, IL (US)

(73) Assignee: Temic Automotive of North America, Inc., Deer Park, IL (US)

( * ) Notice: Subject to any disclaimer, the term of this patent is extended or adjusted under 35 U.S.C. 154(b) by 363 days.

(21) Appl. No.: 10/755,920

(22) Filed: Jan. 13, 2004

(65) Prior Publication Data

US 2005/0151624 A1    Jul. 14, 2005

(51) Int. Cl.
- B60R 25/00 (2006.01)
- G01R 35/00 (2006.01)
- G06F 1/26 (2006.01)
- G08B 1/06 (2006.01)

(52) U.S. Cl. ............. 340/5.72; 702/85; 702/107; 713/323

(58) Field of Classification Search ........ 340/5.72, 340/10.33, 333; 702/89, 85; 713/323
See application file for complete search history.

(56) References Cited

U.S. PATENT DOCUMENTS

| | | | |
|---|---|---|---|
| 5,771,180 A | 6/1998 | Culbert | 702/130 |
| 5,777,816 A * | 7/1998 | Hampshire et al. | 360/77.08 |
| 5,845,204 A | 12/1998 | Chapman et al. | 455/343.1 |
| 5,909,093 A * | 6/1999 | van Dinteren et al. | 318/16 |
| 5,933,090 A | 8/1999 | Christenson | 340/825.69 |
| 6,411,157 B1 | 6/2002 | Hsu et al. | 327/536 |
| 6,643,598 B2 * | 11/2003 | Leichtfried et al. | 340/825.72 |
| 6,725,067 B1 * | 4/2004 | Marx et al. | 455/574 |
| 2004/0174909 A1* | 9/2004 | Marais et al. | 370/524 |
| 2005/0068153 A1* | 3/2005 | Lucy et al. | 340/5.72 |

FOREIGN PATENT DOCUMENTS

JP    09114560 A  *  5/1997

* cited by examiner

Primary Examiner—Wendy Garber
Assistant Examiner—Clara Yang
(74) Attorney, Agent, or Firm—Brian M. Mancini; Terri S. Hughes; Gary J. Cunningham

(57) ABSTRACT

The disclosed embodiments may relate to vehicle (10) having a control system (12) located within the vehicle (10). The control system (12) may include a processor (26) and a wake-up circuit (46) coupled to the processor (26). The processor (26) may utilize a program (34) during a standby mode of operation. The program (34) is configured to provide a voltage to the wake-up circuit (46) for a first time period ($T_1$) once an interrupt is received by the processor (26). Then, the program (34) may monitor the wake-up circuit (46) for a second time period ($T_2$). If a response of the wake-up circuit (46) exceeds at least one of a plurality of predetermined limits, then the program (34) may recalibrate the wake-up circuit (46).

32 Claims, 5 Drawing Sheets

WAKE-UP CIRCUIT

FIELD OF THE INVENTION

The present invention relates generally to a standby power system for circuits and, more particularly, to a wake-up circuit that is recalibrated to prevent excessive drift due to environmental conditions.

BACKGROUND INFORMATION

This section is intended to introduce the reader to various aspects of art, which may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

To operate, a control system receives power from a power source. If the control system is within a vehicle, then the power source may include batteries, a motor, a generator, or other similar devices that provide power. By way of example, when the motor of the vehicle is operating, an alternator may supply power to a vehicle's electrical system and may recharge the vehicle's battery. However, when the vehicle is not operating, the battery provides the primary source of power for the vehicle. Some of the control systems may utilize power from either a battery or a motor, while other control systems may operate from both.

Within the vehicle, the control systems may have different modes of operation depending on the source of power. When the vehicle's motor is operating, which may be referred to as a normal mode of operation, the motor may supply power to the various components of the vehicle. While the motor is operating, the power consumption by the various systems may not be a concern because the motor may be able to supply adequate amounts of power. However, when the vehicle is utilizing the battery to supply power to the systems within the vehicle, which may be referred to as a standby mode of operation, the amount of power available to the various systems may be limited. As such, the use of the control systems may vary depending on the mode of operation.

For instance, during the normal mode of operation, the vehicle's electrical system may supply power to a tire pressure monitoring system within the vehicle. Yet, during the standby mode of operation, the tire pressure system may not operate because the use of the vehicle may not need this system when the vehicle is not operating. Alternatively, body electronics, such as remote keyless entry, window control, trunk access, or other similar features, may be utilized during the standby and normal modes of operation. As such, the control systems, such as the body electronics, may function continuously from the operator's perspective.

During the standby mode of operation, the conservation of power may be an issue for the vehicle's control systems. To conserve power, control systems may operate in a substantially continuous mode to conserve power. The substantially continuous operation may appear to operate continuously to a user, but merely operate for brief intervals to periodically monitor for a change in state. This brief operation allows the control system to perform a specific monitoring activity for a first time period. Then, the control system may remain inactive for a second time period to conserve power. As a specific example, a remote keyless entry system may operate once during a 50 millisecond time period to determine whether a signal has been received from a key associated with the vehicle. If no signal is detected, then the remote keyless entry system may be disabled for a second time interval to conserve power for the vehicle. As such, the remote keyless entry system may appear to be continuously operating from the operator's perspective.

However, for a variety of reasons, control systems may be exposed to various environments while in the standby mode of operation, which may effect the operation of the control systems. The various environments may include extreme temperatures, such as freezing or intense heat, for example. The circuits within the control systems may behave in a different manner depending on the environmental conditions. As a result, some of the circuits may not operate as intended because of the environmental conditions.

Accordingly, control systems may utilize circuits with different tolerance ranges to operation as intended. However, the cheaper circuits may not be able to perform within the specific tolerance range. As such, some control systems may utilize more complex circuits to control the operation of the circuits in different environments. These complex circuits may utilize higher priced components that increase the cost of the control system.

BRIEF DESCRIPTION OF THE DRAWINGS

Advantages of the invention may become apparent upon reading the following detailed description and upon reference to the drawings in which.

DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present technique is an improved approach for operating and recalibrating a wake-up circuit. Under the present technique, the control system may recalibrate the wake-up circuit to minimize the impact of environmental conditions or other causes of drift on the operation of the control system. This may allow the control system to utilize inexpensive circuits that interact with software programs to monitor and recalibrate the wake-up circuit. If the measurements of the wake-up circuit indicate that environmental conditions have affected the wake-up circuit's operation, software programs may recalibrate the settings or parameters associated with the wake-up circuit to be within predetermined limits. Advantageously, the wake-up circuit may utilize less expensive components, while maintaining predetermined operational limits for the control system.

Figure 1:
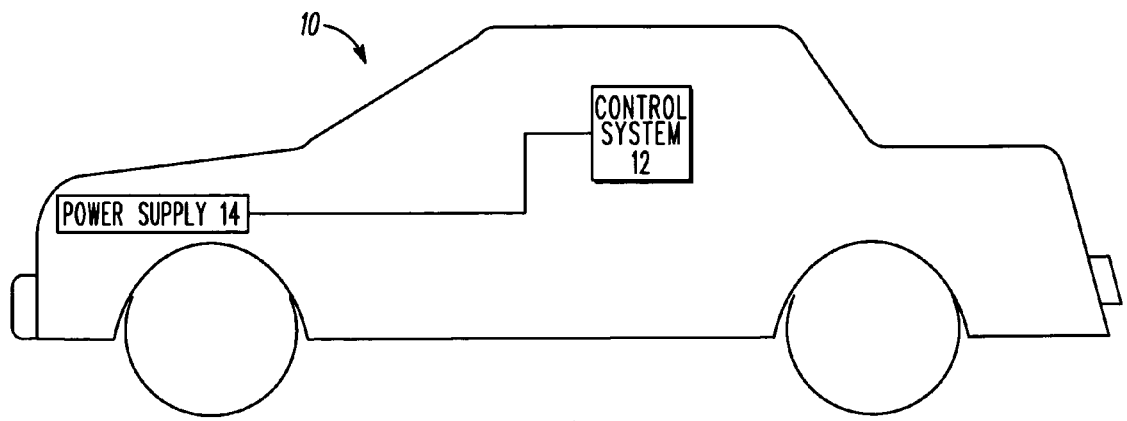
FIG. 1 is a diagram of a vehicle having an exemplary control system in accordance with an embodiment of the present invention.

Turning now to the drawings, and referring initially to FIG. 1, an exemplary vehicle 10 and a control system 12 are illustrated in accordance with an embodiment of the present invention. The vehicle 10 may be any of a variety of vehicle types, such as a car, a truck, an airplane, a boat, or any other type of transportation device. The vehicle 10, such as a car for the purposes of explanation, may include a control system 12 that includes one or more units or systems that are utilized to perform specific activities for the operator of the vehicle 10. These systems may include a window system, a tire pressure system, a lighting system, and a remote keyless entry system, to name but a few examples, as discussed below. Each of these systems may be sub-systems of the control system 12 or body electronics, which are utilized to perform specific functions for the user of the vehicle 10.

A power supply 14 may deliver power to the control system 12 and other systems, such as the window system, the tire pressure system, the lighting system, and the remote keyless entry system. The power supply 14 may supply power generated from the operation of an engine within the vehicle 10, or from the use of a battery connected to the electrical system of the vehicle 10. The battery may include permanent batteries, replaceable batteries, and/or rechargeable batteries.

For the control system 12 to perform a specific function, various systems may perform specific actions for the control system 12. For instance, the window system may control the operation of the windows of the vehicle 10 to allow the operator to open or close the windows. The tire pressure system may monitor the pressure in one or more tires of the vehicle 10, and alert the operator of low-pressure in one of the tires. The lighting system may be utilized to control interior or external lights. The remote keyless entry system may be used to unlock/lock doors and/or to release the trunk latch.

To communicate with the different systems, the control system 12 may utilize physical links or wireless links to establish communication paths with the various systems that may be dispersed throughout the vehicle 10. Through these links, the control system 12 may receive power from the power supply 14, operate the motor for the window system, control the lights of the vehicle through the lighting system, alert the operator to low pressure in a tire by the tire pressure system, or unlock/lock the door latches and trunk latch for remote keyless entry system. The physical or wireless links may utilize various network communication systems or protocols, such as Flex-Ray, controller area network ("CAN"), local interconnect network ("LIN"), telematics, or By-wire. In addition to the network communication systems or protocols, wireless links may also utilize radio frequencies, Bluetooth wireless technologies, time division multiple access ("TDMA"), code division multiple access ("CDMA"), or frequency division multiple access ("FDMA"), and other suitable technologies.

Some of the systems operated by the control system 12 may operate from power delivered from the motor of the vehicle 10, which may be referred to as a normal mode of operation. Also, other systems may also operate from power delivered from batteries of the vehicle 10, which may be referred to as a standby mode of operation. For example, the tire pressure system may be utilized only during the normal mode of operation because the tire pressure system is related to the operation of the vehicle when the vehicle 10 is moving. During the standby mode of operation, the tire pressure system may not operate because a tire with low-pressure is not an operational concern when the vehicle 10 is not moving. As such, the vehicle 10 may conserve power by not utilizing the tire pressure system when the vehicle is operating in the standby mode. However, the remote keyless entry system may be used by the operator to unlock/lock doors and to release the trunk latch, during the normal or standby modes of operation.

When operating from battery power, the control system 12 may operate certain systems in a substantially continuous mode. In this mode, the systems may operate for brief intervals to periodically determine if an input has been received. As an example of the substantially continuous mode, a remote keyless entry system may operate once over a brief interval of time. For instance, the remote keyless entry system may operate once during a 50 millisecond time period. During the operation of the remote keyless entry system, it may poll a transceiver to determine whether a signal has been received from an operator's transmitter. Once the polling is complete, the remote keyless entry system may remain inactive for the remainder of the interval to conserve battery power.

Figure 2:
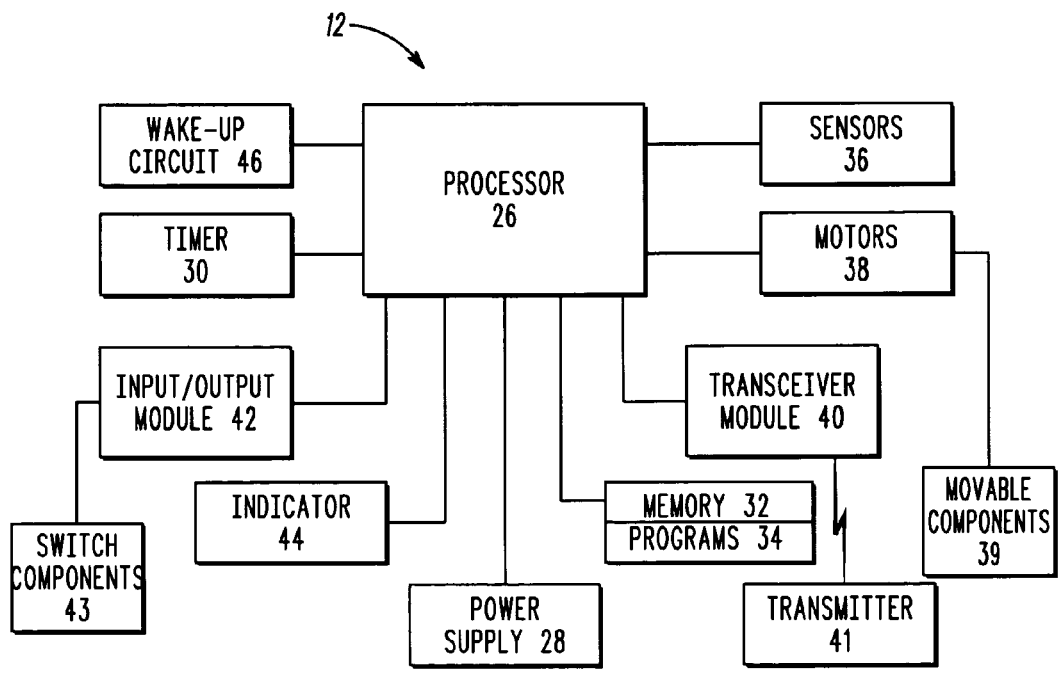
FIG. 2 is a block diagram of an exemplary control system having an exemplary wake-up circuit in accordance with an embodiment of the present invention.

To provide this intermittent activation, the control system 12 or portions of the control system 12 may utilize a wake-up circuit. An exemplary embodiment of a control system 12 with a wake-up circuit 46 is illustrated in FIG. 2. While the control system 12 may include multiple processors for each of the various systems, for exemplary purposes, the control system 12 may include a single processor 26. The processor 26 may be a microprocessor, group of processors, or any number of computing devices generally known to manage the operation of a control system 12 in the vehicle 10. As a specific example, the processor 26 may be a body control module, such as a Motorola MC68HC908AS60A microcontroller unit ("MCU"). The processor 26 controls the operation of the control system 12 through the utilization of various modules or circuitry, such as a power supply 28, a timer 30, a memory 32 that includes programs 34, one or more sensors 36, one or more motors 38, one or more movable components 39, a transceiver module 40, a transmitter 41, an input/output module 42, switch components 43, an indicator 44, and a wake-up circuit 46.

The power supply 28 and the timer 30 may be connected to the processor 26. The power supply 28, which may be the power supply 14 (FIG. 1) or a internal power supply for the control system 12, may provide power to the processor 26 and other components of the control system 12, as discussed above. In addition, the timer 30 may be used to provide a synchronization signal to the processor 26. The timer 30 may be a 4 Mega-hertz crystal, for instance.

Because the processor 26 controls the operation of the control system 12, which may be under the control of software programming, the memory 32 is coupled to the processor 26. The memory 32 may include dynamic random access memory, static random access memory, read-only memory, flash memory, or any combination of these types of memory. The processor 26 may utilize the memory 32 to store data and/or programs 34 that are utilized in operation of the control system 12.

The programs 34 may perform specific instructions, such as monitoring or calculating response times for the wake-up circuit 46, for example. The programs 34 may include a wake-up routine and a calibration routine that are utilized by the processor 26 to operate the wake-up circuit 46 within predetermined limits. The wake-up routine may utilize parameters stored in the memory 32 to apply a voltage to the wake-up circuit and monitor the response of the wake-up circuit 46, which is discussed below in greater detail. The calibration routine may be utilized to adjust the parameters that are stored in memory 34 to maintain the operation of the wake-up circuit 46 within the predetermined limits, also discussed below.

During the operation of the control system 12, the processor 26 and the programs 34 may utilize the sensors 36 to access data and the motors 38 to perform actions for the control system 12 within the vehicle 10. The sensors 36 may provide data or state change information to the programs 34. The sensors 36 may include pressure sensors, acceleration sensors, and/or switch inputs. The motors 38 may be used to perform specific actions on components within the vehicle 10 (FIG. 1). The motors 38, which may be an actuator, may be used to activate one or more movable components 39, such as a door lock, a lock actuator, a window, and/or a trunk latch, for instance.

Additionally, the processor 26 and the programs 34 may utilize the transceiver module 40, the input/output module 42, and the indicator 44 to exchange data and interface with the operator during the standby or the normal modes of operation. The transceiver module 40 may exchange information with sensors 36, a transmitter 41, or components that are connected through a wireless link or external to the vehicle 10 (FIG. 1). The transceiver module 40 may include a radio frequency receiver, such as Motorola MC33591, while the transmitter 41 may be a microcontroller/transmitter, such as the Motorola MC68HC908RF2 MCU. The transmitter 41 may be utilized to provide a signal to the transceiver module 40 to indicate that the doors of the vehicle 10 may be locked/unlocked. The input/output module 42 may exchange data between the processor 26, a switch component 43, and/or other systems within the vehicle 10 (FIG. 1). The switch component 43 may be a switch that turns the lights on or off for the lighting system. Furthermore, the indicator 44 may be used to alert the operator to a specific condition within the vehicle 10 (FIG. 1), such as low pressure in a tire. The indicator 44 may include a light, an LCD screen, or a display. Each of these components may operate in the normal mode and/or standby mode depending on the specific system that the components are associated with.

The wake-up circuit 46 is not utilized during the normal mode of operation, but may be implemented to operate the control system 12 intermittently when the control system 12 is in standby mode. In standby mode, the control system 12 may utilize the wake-up circuit 46, processor 26, and programs 34 to periodically operate the control system 12. As discussed above, the programs 34 may include the wake-up routine that activates the control system 12 and the calibration routine that recalibrates the settings or parameters used by the wake-up routine.

The wake-up routine may utilize various parameters, such as time periods, voltages, or other values to control the operation of the control system 12. The time period during which the wake-up circuit 46 is utilized may vary depending on the system's specific design. For instance, if the wake-up circuit 46 is utilized for a remote keyless entry system, then the wake-up circuit 46 may activate the control system 12 for less than 1 millisecond every 60 milliseconds. To operate, the wake-up circuit 46 may generate an interrupt that results in the processor 26 applying a voltage to the wake-up circuit 46. While the voltage is applied, the processor 26 may access sensors 36, the transceiver module 40, or switch components 43 to determine whether a change in state has been detected. An input from one of the sensors 36 or the receipt of a signal at the transceiver module 40 may indicate the change in state. Then, the voltage may be removed from the wake-up circuit 46 and the wake-up circuit may be monitored for a second time interval.

Beneficially, the operation of the control system 12 may appear to be continuous to the operator, but is inactive for specific periods of time. The inactive periods may reduce the amount of power consumed by control system 12, which prolongs the battery life and the operation of the control system 12. As such, wake-up circuit 46 enhances the control system's operation by reducing the power consumed during standby mode.

Because the standby mode of operation may continue for extended periods of time, the circuitry of the control system 12 may be subjected to different environmental conditions. The environmental conditions may include temperature changes, such as cold or hot temperatures, changes in the humidity, or other similar changes that may impact the operation of the circuitry, such as the wake-up circuit 46. To account for these environmental conditions, the control system 12 may use programs 34, such as the calibration routine, to adjust the stored parameters. The adjustments to the parameters may maintain the operation of the wake-up circuit 46 within certain operating or predetermined limits. These predetermined limits may include settings, which include acceptable tolerance ranges for the operation of the wake-up circuit 46. The tolerance ranges may include upper and lower limits for time delays and voltage levels that are used to maintain the response times of the wake-up circuit 46 or control system 12.

Beneficially, by utilizing the calibration routine with the wake-up circuit 46, the control system 12 may use various lower cost components to perform the periodic wake-up in an accurate and stable manner. The calibration routine may access and update the stored parameters to compensate for environmental conditions. As such, when the environmental conditions influence the operation of the wake-up circuit 46, the stored parameters may be recalibrated to maintain the predetermined limits for the wake-up circuit 46.

Figure 3:
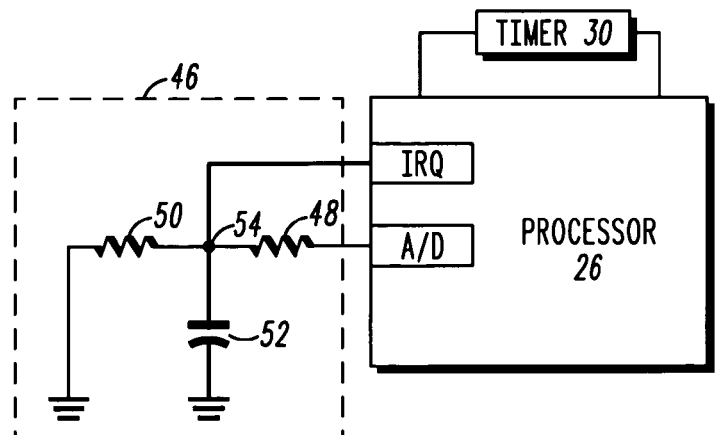
FIG. 3 is a schematic diagram of an exemplary wake-up circuit coupled to the processor of FIG. 2 in accordance with an embodiment of the present invention.

FIG. 3 is a schematic diagram of a wake-up circuit 46 associated with the processor 26 in accordance with an embodiment of the present invention. The wake-up circuit 46 may be connected to the processor 26 through an analog/digital port A/D and an interrupt port IRQ. Through these connections, the wake-up circuit 46 may intermittedly activate the processor 26 and recalibrate the parameters within the memory 32 to maintain the operation of the wake-up circuit 46 within the predetermined limits.

The wake-up circuit 46 may include a first resistor 48, a second resistor 50, and a capacitor 52. A first terminal of the first resistor 48 is connected to the port A/D. The second terminal of the first resistor 48 is connected to a first terminal of the capacitor 52, a first terminal of the second resistor 50, and the port IRQ at a node 54. The second terminal of the capacitor 52 and the second terminal of the second resistor 50 are connected to ground or a lower voltage potential. Furthermore, the processor 26 may be connected to a timer 30, which may provide a specific clock cycle, as discussed above.

The specific components of the wake-up circuit 46 may vary depending on the specific design and software program. For instance, the wake-up circuit 46 may be utilized by the processor 26 to operate the transceiver module 40 once every 60 milliseconds. The transceiver module 40 may be activated by an interrupt being received by the processor 26. The transceiver module 40 may determine if a signal is being transmitted from the transmitter 41, which may be associated with the user of the vehicle 10. Once the transceiver module 40 has made this determination, it may remain inactive until another interrupt is received. However, the processor 26 may monitor the wake-up circuit 46 to determine whether the wake-up circuit 46 is operating within predetermined limits.

To operate within the predetermined limits, the first resistor 48, the second resistor 50 and the capacitor 52 may be selected based on the intended monitoring interval and the resistive-capacitive (RC) time constant that is associated with the components. The first resistor 48 may be utilized to control the rate of the charge of the capacitor 52, which may be based on the time period that the monitoring activity is to be active. Similarly, the second resistor 50 may be utilized to control the rate of discharge of the capacitor 52, which may be the time period between monitoring activities. By utilizing the different resistors along with the capacitor, the desired operational and inactive periods may be provided for the wake-up circuit 46. As an example of one embodiment of the wake-up circuit 46, the processor 26 may be a Motorola MC9S12DP256 microcontroller unit ("MCU"), while the capacitor 52 may be a 0.47 micro Farad capacitor. Also, the first resistor 48 may be a 4.3 kilo-Ohm resistor, while the second resistor 50 may be a 100 kilo-Ohm resistor.

To compensate for environmental conditions, the processor 26 may utilize the programs 34 to recalibrate the parameters associated with the wake-up circuit 46. The selection of the parameters that are utilized to operate the wake-up circuit 46 may vary depending on the specific system being monitored. For instance, with a remote keyless entry system that operates once every 60 milliseconds, the output time period $T_1$ may be less than 1 millisecond, the monitor time period $T_2$, may be about 60 milliseconds, and the output voltage $V_{ADHIGH}$ may be 5 volts. If the measured responses of the wake-up circuit 46 are outside of the predetermined limits, then the parameters may be adjusted in a calibration routine to perform within the predetermined limits.

Figure 4:
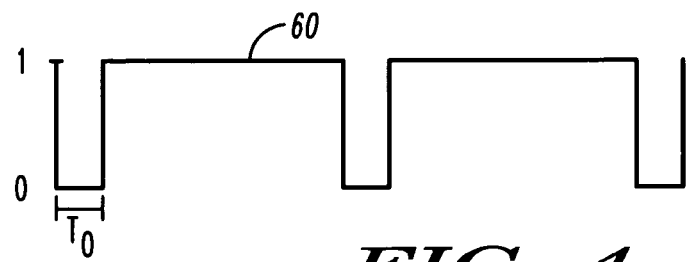
FIGS. 4–6 illustrate a timing chart of an A/D state, an interrupt state, and node state of the wake-up circuit in FIG. 3 in accordance with an embodiment of the present invention.
Figure 5:
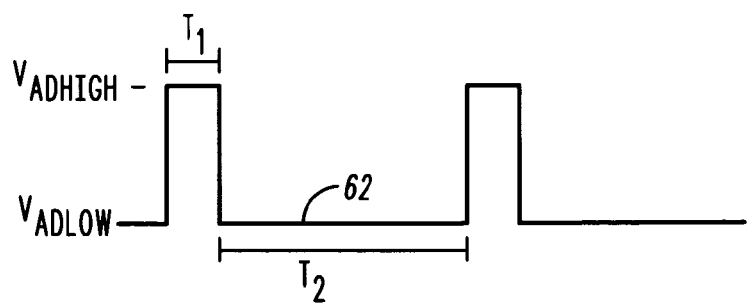
Figure 6:
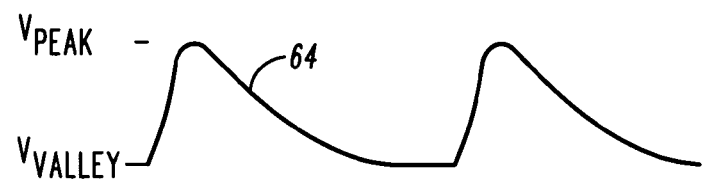

To understand the operation of the wake-up circuit 46, FIGS. 4–6 illustrate timing charts of the wake-up circuit 46 and the processor 26 that relate to an A/D state, an interrupt IRQ state, and a node state in accordance with an embodiment of the present invention. The timing charts 60, 62, and 64 may be best understood by concurrently viewing FIG. 3. It should also be noted that the timing charts 60, 62, and 64 are merely used for illustrative purposes, and may vary depending on environmental conditions and alternative embodiments.

To operate the wake-up circuit 46, an interrupt is received at the port IRQ. Once the interrupt is received, the port A/D may begin to supply the wake-up circuit 46 with an output voltage $V_{ADHIGH}$ for an output time period $T_1$. During the output time period $T_1$, the voltage at the node 54 will continue to increase as the capacitor 52 stores a charge. At the end of output time period $T_1$, the port A/D may stop providing output voltage $V_{ADHIGH}$ to the wake-up circuit 46. Then, the port A/D may begin to monitor the voltage level at the port A/D for a monitor time period $T_2$. During the monitor time period $T_2$, the capacitor 52 dissipates the stored charge through the second resistor 50 to ground, while the port A/D monitors the voltage level at the node 54. Accordingly, the processor 26 and the programs 34 may monitor the wake-up circuit 46 and utilize the data to determine whether the wake-up circuit 46 is operating within the predetermined limits.

As depicted in timing chart 60 of FIG. 4, the IRQ state timing chart 60 indicates a logical low, "0," or a logical high, "1." The IRQ state drops to the logical low "0" from the logical high "1" for an interrupt time period of $T_0$. After the interrupt time period $T_0$, the IRQ state returns to the logical high "1," which may be 2.5 volts, 3 volts, 5 volts, or any other suitable voltage. As the IRQ state drops to the low logical state "0," the programs 34 (FIG. 2), such as the calibration or the wake-up routine, may indicate that the port A/D is to generate a voltage, such as output voltage $V_{ADHIGH}$ discussed below.

As depicted in timing chart 62 of FIG. 5, the A/D state may correspond to the port A/D that is used to monitor and provide a voltage to the wake-up circuit 46. The A/D state may include a low voltage $V_{ADLOW}$ and a high output voltage $V_{ADHIGH}$, which is the voltage at the port A/D. During the output time period $T_1$, the port A/D may produce the output voltage $V_{ADHIGH}$, as shown in timing chart 62. After the output time period $T_1$, the port A/D may stop producing the output voltage $V_{ADHIGH}$. Once the output voltage $V_{ADHIGH}$ is no longer being provided to the wake-up circuit 46, the A/D state may monitor the wake-up circuit 46 over a monitor time period $T_2$ or until the IRQ state indicates that the port A/D is to generate the output voltage $V_{ADHIGH}$, as discussed above with regard to FIG. 4.

As depicted in timing chart 64 of FIG. 6, the node state, which is the voltage at the node 54, begins at a low voltage of valley voltage $V_{VALLEY}$ at the interrupt time period $T_0$, which is the voltage applied to the port IRQ from the capacitor 52. The node voltage increases as the port A/D generates an output voltage $V_{ADHIGH}$ for the output time period $T_1$. During the output time period $T_1$, the node voltage may increase from the low valley voltage $V_{VALLEY}$ to the high peak voltage $V_{PEAK}$, which is reached at the end of the output time period $T_1$. The increase in the voltage from the low valley voltage $V_{VALLEY}$ to the high peak voltage $V_{PEAK}$ corresponds to the charging of the capacitor 52, while the port A/D provides the output voltage $V_{ADHIGH}$. The high peak voltage $V_{PEAK}$ may be the peak voltage reached when the output voltage $V_{ADHIGH}$ is applied to the capacitor from the port A/D through the first resistor 48. During the monitor time period $T_2$, the voltage of the node state decreases as the capacitor 52 dissipates the stored charge across the second resistor 50 to ground. The capacitor 52 discharges to ground through the second resistor 50 because the impedances of the port IRQ and port A/D are high. The dissipation continues until the low valley voltage $V_{VALLEY}$ is reached or until the port A/D provides an output voltage $V_{ADHIGH}$.

Figure 7:
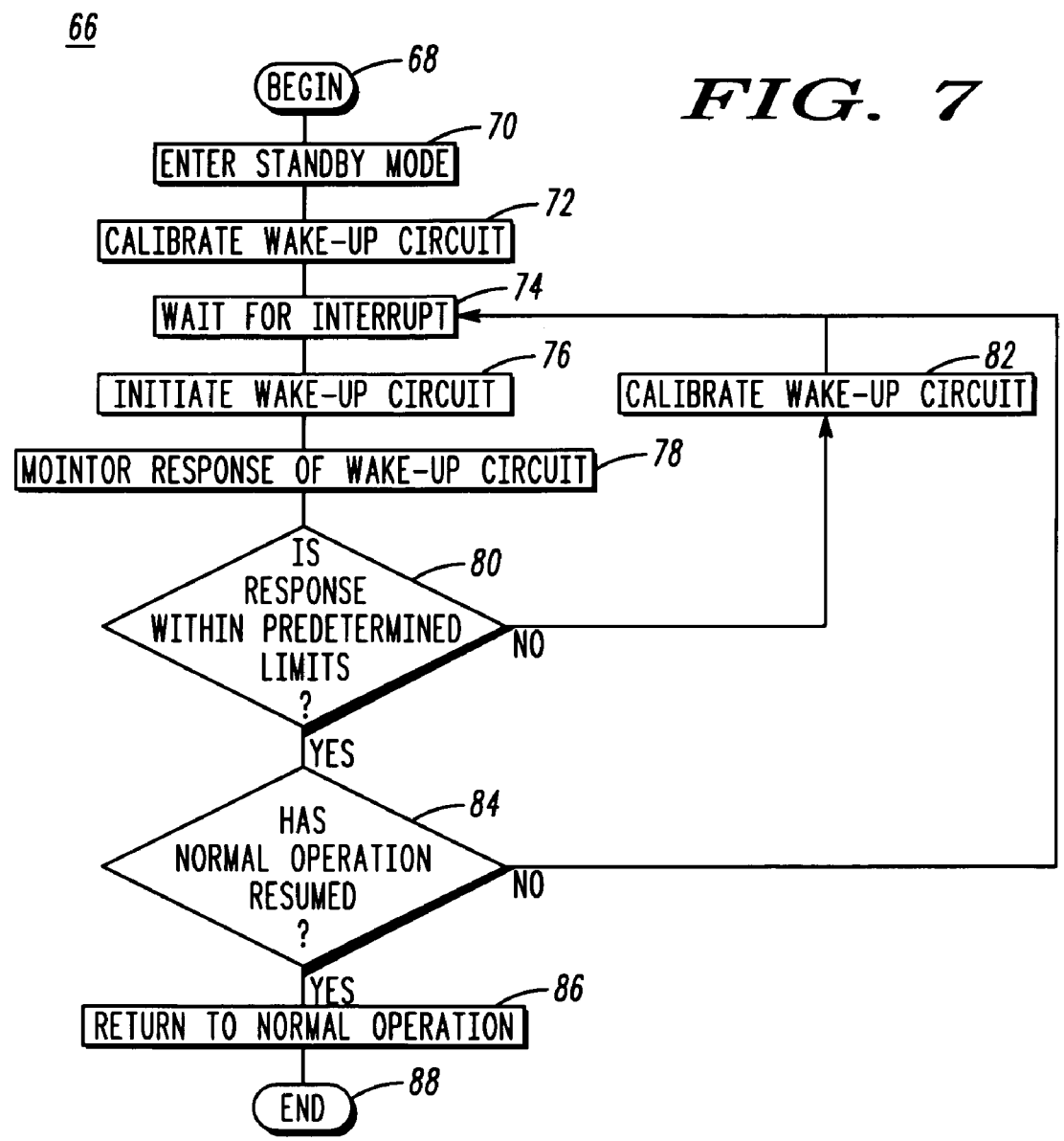
FIG. 7 is a flow diagram of an exemplary process for utilizing the wake-up circuit in accordance with an embodiment of the present invention.

The operation of the wake-up circuit 46 is further explained in a flow diagram, generally designated by the reference numeral 66, as depicted in FIG. 7. The flow diagram 66 may be better understood by concurrently viewing FIGS. 1–6. In the flow diagram 66, the control system 12 may utilize the programs 34 to monitor the drift of the wake-up circuit 46. As discussed above, the wake-up circuit 46 may be utilized by the processor 26 to maintain the periodic monitoring of sensors 36, transceiver module 40, and/or an I/O module 42. In addition, the programs 34 may periodically recalibrate the parameters to maintain that the wake-up circuit 46 is operating within the predetermined limits.

Accordingly, the process begins at block 68. At block 70, the control system 12 may enter a standby mode of operation. The standby mode of operation may include disabling certain systems that are utilized during the operation of the vehicle 10, while other systems operate in a continuous or substantially continuous manner. At block 72, the control system 12 may calibrate the wake-up circuit 46 to set parameters within the predetermined limits. The parameters, such as the output voltage $V_{ADHIGH}$, the output time period $T_1$, and the monitor time period $T_2$, may be set to insure that the control system 12 may operate within the predetermined limits. The predetermined limits may include tolerance ranges to ensure that the control system 12 operates properly while in standby mode.

After the initial calibration, the wake-up circuit 46 may wait for an interrupt to be received on the port IRQ, as shown in block 74. The initiation of the wake-up circuit 46 may be indicated from the receipt of an interrupt on the port IRQ, as shown in block 76. Once the interrupt is received, the processor 26 may utilize software routines or programs 34 to perform the specific control activity. The control activity may include polling the transceiver module 40 to determine if a signal has been received or accessing sensors 36 to determine if an event has occurred, for example. With the wake-up circuit 46 being activated, the processor 26 may utilize the programs 34 to monitor the response of the wake-up circuit 46 to various voltages for specific time periods, as shown in block 78. The voltages may include applying the output voltage $V_{ADHIGH}$ for the output time period $T_1$ to the wake-up circuit 46 at the port A/D. After applying this voltage, the port A/D may monitor the voltage level at the port A/D for a monitor time period $T_2$, as discussed above.

Depending on the response of the wake-up circuit 46, the control system 12 may recalibrate the wake-up circuit 46 or continue to operate without recalibration. At block 80, the control system 12 may determine if the response of the wake-up circuit 46 is within the predetermined limits or specified range. If the wake-up circuit 46 is not operating within the predetermined limits, then the control system 12 may use the programs 34, such as the calibration routine, to recalibrate the parameters and settings related to the wake-up circuit 46, as shown in block 82. The recalibration of the wake-up circuit 46 may adjust the parameters, such as the output voltage $V_{ADHIGH}$, the output time period $T_1$, and the monitor time period $T_2$, to influence the response of the wake-up circuit 46. When the wake-up circuit 46 is operating within the predetermined limits, which may be an accepted range of voltage levels and/or time delays, the parameters may be stored within the memory 32. Once the wake-up circuit 46 has been calibrated, the wake-up circuit 46 may wait for an interrupt to be received on the port IRQ, as shown in block 74.

However, if the responses of the wake-up circuit 46 are within the specified range, then the processor 26 may determine if normal operation has resumed at block 84. The normal operation of the vehicle 10, which includes the operation of the engine to provide power to the vehicle 10, may be indicated by the operation of the engine or receipt of a signal at the processor 26. As discussed above, with the engine being utilized, the conservation of power may not be an issue of concern. Accordingly, if the processor 26 has not returned to normal operation, the processor 26 may wait for an interrupt at block 74. However, if the processor 26 has returned to normal operation, then control system 12 may return to normal operation, as shown in block 86. During the normal operation, the control system 12 may not utilize the wake-up circuit 46. Accordingly, the process ends at block 88.

It should be noted that the embodiments described herein may be implemented in a variety of different manners. For instance, as an alterative embodiment, after block 70, a threshold event may be utilized to determine when programs 34, such as the calibration process, should be performed on the wake-up circuit 46. The threshold event may involve counting the number of times that an interrupt has been generated, monitoring the number of times the comparison has been made between the responses of the wake-up circuit, and/or measuring a time period from a previous calibration of the wake-up circuit. As a specific example, if the number of times the wake-up circuit has been activated reaches or exceeds a predetermined number, then the programs 34 may initiate the calibration process, as shown in block 82. However, if the number of times the wake-up circuit 46 has been activated is less than the predetermined number, then the programs 34 may determine if the normal operation has resumed, as shown in block 84. As such, the wake-up circuit 46 may be calibrated when the threshold event occurs to activate the calibration process.

Figure 8:
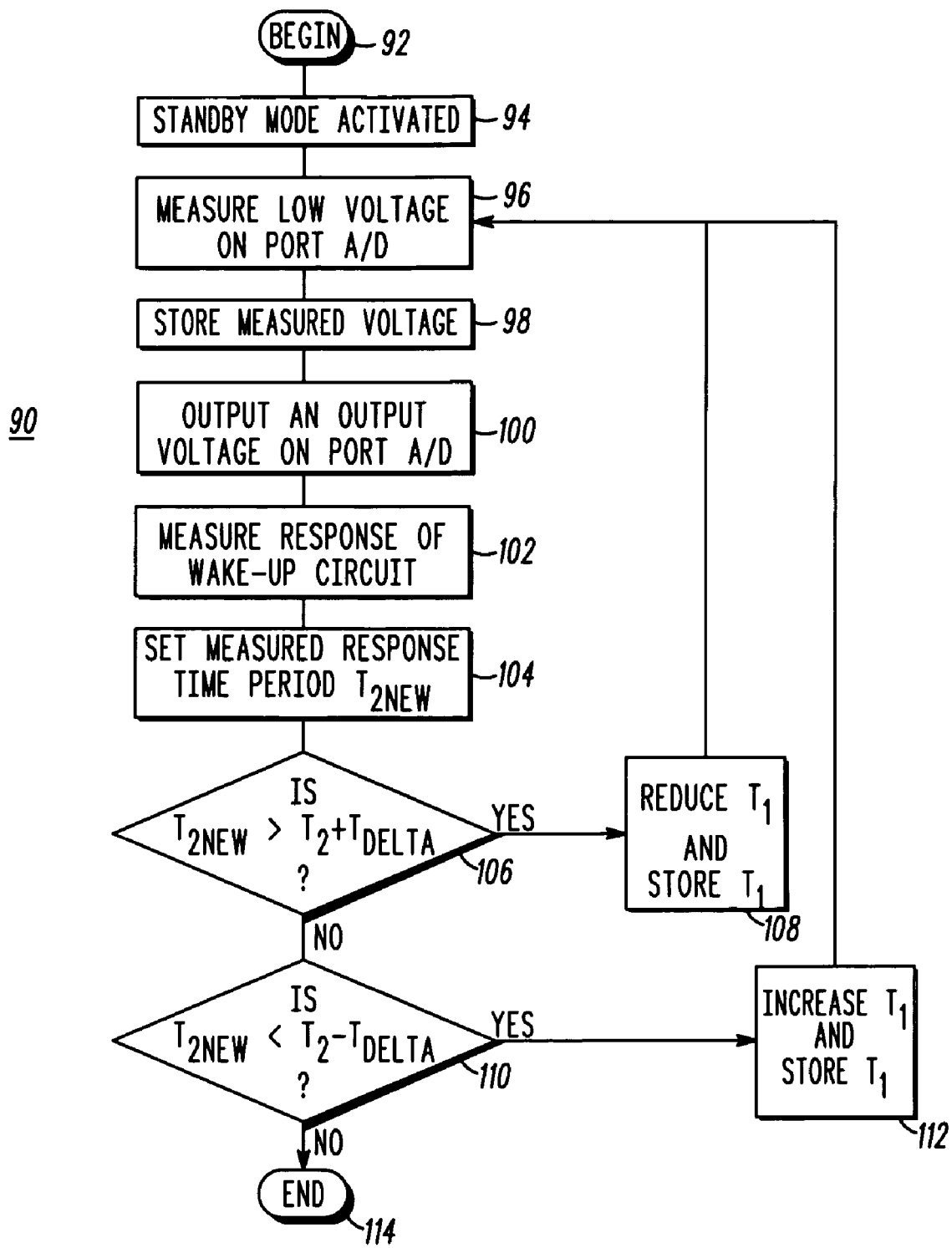
FIG. 8 is a more detailed flow diagram of an exemplary process for calibrating the wake-up circuit in accordance with an embodiment of the present invention.
Figure 9:
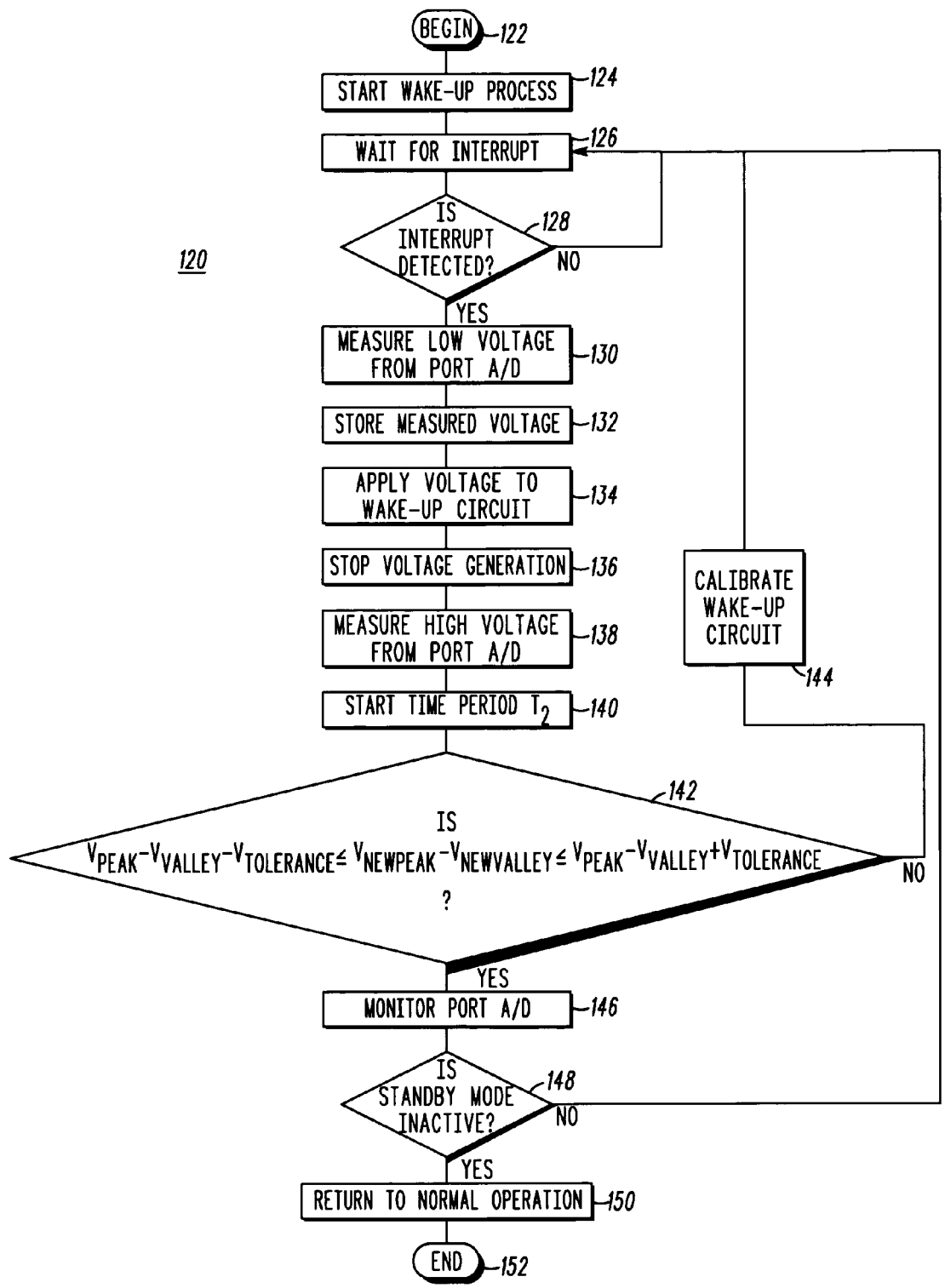
FIG. 9 is a more detailed flow diagram of an exemplary process for utilizing the wake-up circuit in accordance with an embodiment of the present invention.

As discussed above, the operation of the processor 26 with the wake-up circuit 46 may involve a calibration process and a wake-up process, which are explained in more detail below in FIGS. 8–9. In FIGS. 8–9, the flow diagram 90 of FIG. 8 and the flow diagram 120 may be better understood by concurrently viewing FIGS. 1–7. The flow diagram 90 relates to the calibration process for the wake-up circuit 46, while the flow diagram 120 relates to the operation and monitoring process of the wake-up circuit 46.

As depicted in FIG. 8, the calibration process of the wake-up circuit 46 is further explained in the flow diagram 90. The calibration process may be utilized by the processor 26 to maintain the operation of the wake-up circuit 46 within predetermined limits. The calibration process may be one of the programs 34 stored in memory 32 that may be utilized by the processor 26. To calibrate the operation of the control system 12, various parameters, such as output time period $T_1$, monitor time period $T_2$, output voltage $V_{ADHIGH}$, peak voltage $V_{PEAK}$, valley voltage $V_{VALLEY}$, and any other suitable values, may be stored in memory 32 for access in calibrating the wake-up circuit 46.

The process begins at block 92. At block 94, the calibration process is started. The calibration process, which may be one of the programs 34 in memory 32, may be activated by the processor 26 or as the result of a signal received by the processor 26. To start the calibration process, the processor 26 may measure the voltage, such as low valley voltage $V_{VALLEY}$, from the port A/D, as shown in block 96. The value measured from the port A/D may be stored within the memory 32, as shown in block 98. At block 100, an output voltage $V_{ADHIGH}$ is supplied to the wake-up circuit 46 from the port A/D for an output time period $T_1$. The output voltage $V_{ADHIGH}$ charges the capacitor 52 to a voltage level of peak voltage $V_{PEAK}$. After the output time period $T_1$, the port A/D may measure and record the voltage at the port A/D. Also, the port A/D may measure the time for the signal on the port IRQ to reach a predetermined voltage level, such as 4 volts. When the voltage level reaches or exceeds the predetermined level, the new monitor time period $T_{2NEW}$ is set at block 104.

With the measured values, the processor 26 may compare the new monitor time period $T_{2NEW}$ with a predetermined monitor time period $T_2$, as shown in block 106. The predetermined monitor time period $T_2$ may be a value that was previously stored in memory 32. If the new monitor time period $T_{2NEW}$ is greater than the monitor time period $T_2$ plus a delta amount of time $T_{DELTA}$, which is a predetermined limit, then the output time period $T_1$ is reduced at block 108. The reduced output time period $T_1$ replaces the output time period $T_1$ in memory 32. Then, the calibration process returns to recalibrate wake-up circuit 46 again, as previously discussed in block 96. However, if the new monitor time period $T_{2NEW}$ is not greater than the monitor time period $T_2$ plus a delta amount of time $T_{DELTA}$, then the new monitor time period $T_{2NEW}$ is compared to the monitor time period $T_2$ minus a delta amount of time $T_{DELTA}$ at block 110. If the new monitor time period $T_{2NEW}$ is less than the monitor time period $T_2$ minus a delta amount of time $T_{DELTA}$, then the output time period $T_1$ is increased and replaces the stored output time period $T_1$ at block 112. With the new output time period $T_1$, the calibration process returns to recalibrate the wake-up circuit 46 within the predetermined limits, as shown in block 96. However, if the new monitor time period $T_{2NEW}$ is not less than the monitor time period $T_2$ minus a delta amount of time $T_{DELTA}$, then the calibration process ends at block 114.

As depicted in FIG. 9, the wake-up process, which may be one of the programs 34 stored in memory 32, may activate the wake-up circuit 46 as explained in the flow diagram 120. The wake-up process may be utilized by the processor 26 to reduce the power consumed by the operation of the control system 12 when operating from battery power or in a standby mode. The wake-up process conserves power by periodically operating the control system 12 through the use of the wake-up circuit 46. Similar to the calibration process, programs 34 may utilize various stored parameters, such as output time period $T_1$, monitor time period $T_2$, output voltage $V_{ADHIGH}$, peak voltage $V_{PEAK}$, valley voltage $V_{VALLEY}$, and/or any other suitable values, to operate the wake-up circuit 46.

Accordingly, the process begins at block 122. At block 124, the processor 26 may start the wake-up process. The wake-up process may utilize the wake-up circuit 46 to periodically activate the control system 12 to monitor for an input signal or a change in state. At block 126, the programs 34, such as the wake-up routine, may wait for an interrupt. At block 128, the programs 34 may determine if an interrupt has been indicated on the port IRQ. If an interrupt has not been detected, then the wake-up routine may continue to wait for an interrupt, as discussed above in block 126.

However, if an interrupt is detected, then wake-up process may begin with the processor 26 measuring the voltage level on the port A/D, which may be $V_{NEWVALLEY}$, as shown in block 130. At block 132, the measured voltage may be stored in memory 32. At block 134, a voltage, such as output voltage $V_{ADHIGH}$, is applied to the port A/D for a specified output time period $T_1$. While the output voltage $V_{ADHIGH}$ is applied to the wake-up circuit 46, the processor 26 may perform monitoring activities, such as detecting if a change in state is indicated from the sensors 36 or if a signal has been received from the transceiver module 40, for example. The amount of voltage to be applied to the wake-up circuit 46 and the specified output time period $T_1$ may be stored within memory 32. At the end of the specified output time period $T_1$, the output voltage $V_{ADHIGH}$ supplied to the wake-up circuit 46 is stopped, as shown in block 136. Then, the port A/D may measure the new peak voltage $V_{NEWPEAK}$ on the port A/D, which may be stored in memory 32, as shown in block 138. Also, the monitor time period $T_2$ may be started after the stop instruction is received at block 140.

During the monitor time period $T_2$, the programs 34 may compare the voltages at the port A/D. For instance, as shown in block 142, the new voltage $V_{NEWPEAK}$ minus the new valley voltage $V_{NEWVALLEY}$ may be compared to the peak voltage $V_{PEAK}$ minus the valley voltage $V_{VALLEY}$ plus or minus a tolerance voltage $V_{TOLERENCE}$, which may be predetermined limits for the wake-up circuit 46. If the new peak voltage $V_{NEWPEAK}$ minus the new valley voltage $V_{NEWVALLEY}$ is less than peak voltage $V_{PEAK}$ minus the valley voltage $V_{VALLEY}$ minus a tolerance voltage $V_{TOLERENCE}$ or greater than the peak voltage $V_{PEAK}$ minus the valley voltage $V_{VALLEY}$ plus a tolerance voltage $V_{TOLERENCE}$, then the programs 34 may recalibrate the parameters, as shown in block 144. However, if new peak voltage $V_{NEWPEAK}$ minus the new valley voltage $V_{NEWVALLEY}$ is greater than or equal to the peak voltage $V_{PEAK}$ minus the valley voltage $V_{VALLEY}$ minus a tolerance voltage $V_{TOLERENCE}$ and less than or equal to the peak voltage $V_{PEAK}$ minus valley voltage $V_{VALLEY}$ plus the tolerance voltage $V_{TOLERENCE}$, then the port A/D may measure the voltage at the port A/D during the monitor time period $T_2$, as shown in block 146.

After the monitor time period $T_2$, the routine may determine if a signal indicates that standby mode is active at block 148. If the standby mode is indicated, then the control system 12 may wait for an interrupt at block 126. However, if the signal indicates that normal operation has resumed, then the processor 26 may return to normal operation, as shown in block 150. Accordingly, the process ends at block 152.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. An apparatus, comprising:
   a vehicle; and
   a control system located in the vehicle, the control system comprising:
   a processor,
   a wake-up circuit coupled to the processor;
   a program utilized by the processor during a standby mode of operation, the program configured to:
   provide a voltage to the wake-up circuit for a first time period once an interrupt is received by the processor;
   monitor the wake-up circuit for a second time period; and
   recalibrate the voltage to the wake-up circuit if a response of the wake-up circuit exceeds at least one predetermined limit.

2. The apparatus, as set forth in claim 1, wherein the control system comprises a remote keyless entry system.

3. The apparatus, as set forth in claim 2, wherein the control system comprises a lock actuator in communication with the processor, wherein the lock actuator is configured to engage and disengage a door lock.

4. The apparatus, as set forth in claim 3, wherein the remote keyless entry system comprises a transceiver module that is coupled to the processor and adapted to receive a signal from a transmitter to activate the lock actuator to unlock the door lock.

5. The apparatus, as set forth in claim 1, wherein the control system comprises a window system.

6. The apparatus, as set forth in claim 5, wherein the window system comprises a motor coupled to the processor and a window, wherein the motor moves the window.

7. An automotive control system, comprising:
a microprocessor;
a wake-up circuit coupled to the microprocessor;
a memory coupled to the microprocessor;
a program within the memory and utilized by the microprocessor, the program configured to:
apply a voltage to the wake-up circuit for a first time period;
measure a response of the wake-up circuit for a second time period;
determine if the response is within a predetermined limit; and
recalibrate the voltage if the response is not within the predetermined limit.

8. The automotive control system, as set forth in claim 7, wherein the program accesses a plurality of stored parameters to determine the voltage.

9. The automotive control system, as set forth in claim 8, wherein the plurality of stored parameters are stored in the memory.

10. The automotive control system, as set forth in claim 7, wherein the recalibration of the voltage updates at least one of a plurality of stored parameters.

11. The automotive control system, as set forth in claim 7, wherein the microprocessor comprises a first port and a second port coupled to the wake-up circuit; and wherein the voltage is provided to the wake-up circuit through the first port and the response is measured from the first port.

12. The automotive control system, as set forth in claim 7, wherein the wake-up circuit comprises:
a first resistor having a first terminal and a second terminal, wherein the first terminal is coupled to ground;
a second resistor having a third terminal coupled directly to the second terminal at a node and a fourth terminal coupled to a first port; and
a capacitor having a fifth terminal coupled to each of the second terminal, the third terminal, and a second port and a sixth terminal coupled to ground.

13. One or more tangible computer readable mediums encoded with a computer program for operating and recalibrating a wake-up circuit, the program comprising:
a routine for applying a voltage to a wake-up circuit for a first time period in response to an interrupt;
a routine for measuring a response of the wake-up circuit for a second time period;
a routine for determining if the response is within a predetermined limit; and
a routine for recalibrating the voltage if the response is not within the predetermined limit.

14. The computer program, as set forth in claim 13, wherein the tangible medium is a memory.

15. The computer program, as set forth in claim 13, comprising a routine for accessing a plurality of stored parameters to determine the voltage.

16. The computer program, as set forth in claim 13, wherein recalibrating comprises updating the voltage if the response is not within the predetermined limit.

17. The computer program, as set forth in claim 13, wherein the routine for applying the voltage is activated by the interrupt received at a processor.

18. The computer program, as set forth in claim 13, wherein the routine for applying the voltage to the wake-up circuit is utilized when a standby mode is indicated by a processor.

19. A method of monitoring a control system, the method comprising the acts of:
providing an interrupt signal to a microprocessor;
measuring a first voltage on a port of the microprocessor connected to a wake-up circuit;
generating an output voltage for a time period on the port;
measuring a second voltage on the port once the output voltage generation stops;
comparing the first voltage and second voltage to at least one stored parameter;
determining if the comparison is within or equal to a predetermined limit; and
recalibrating at least one of the output voltage and time period, if the comparison exceeds the predetermined limit.

20. The method, as set forth in claim 19, comprising providing an interrupt signal to another port of the microprocessor connected to the wake-up circuit.

21. The method, as set forth in claim 19, wherein recalibrating comprises:
reducing the time period stored in memory, if the comparison is greater than the predetermined limit; and
increasing the time period stored in memory, if the comparison is less than the predetermined limit.

22. The method, as set forth in claim 19, wherein the acts are performed in the order recited.

23. The method, as set forth in claim 19, wherein the predetermined limit is stored in a memory coupled to the microprocessor.

24. The method, as set forth in claim 19, comprising recalibrating at least one of the output voltage and the time period once a predetermined number of interrupts have been performed.

25. A method of manufacturing a control system comprising the acts of:
providing a processor;
coupling a wake-up circuit to the processor;
encoding an program to:
provide a voltage to the wake-up circuit for a first time period if a standby mode is indicated;
stop providing the voltage at the end of the first time period;
monitor a response of the wake-up circuit for a second time period; and
recalibrate the voltage if the response exceeds at least one of a plurality of predetermined limitations.

26. The method, as set forth in claim 25, comprising coupling a memory to the processor.

27. The method, as set forth in claim 26, comprising storing the encoded program in the memory.

28. The method, as set forth in claim 25, wherein coupling the wake-up circuit comprises:
coupling a first resistor to a first port and a second port of the processor;
coupling a capacitor and a second resistor in parallel between the first port and a lower voltage potential.

29. A method of monitoring a control system, the method comprising the acts of:
provide an interrupt signal to a microprocessor;
operating the microprocessor to detect a state change for a control system when the interrupt is provided;
determining whether a threshold event has occurred;
recalibrating an output voltage associated with a wake-up circuit, so that the output voltage is within a predetermined limit, if the threshold event has occurred; and
waiting for another interrupt to be provided to the microprocessor, if the threshold event has not occurred.

30. The method, as set forth in claim 29, comprising accessing a switch component to determine whether the state change has occurred.

31. The method, as set forth in claim 29, wherein the threshold event comprises counting the number of times an interrupt has been provided to the microprocessor connected to the wake-up circuit.

32. The method, as set forth in claim 29, wherein the threshold event comprises measuring a time period from the previous calibration of the wake-up circuit.

* * * * *